(12) United States Patent
Kannan et al.

(10) Patent No.: US 9,304,793 B2
(45) Date of Patent: Apr. 5, 2016

(54) MASTER AUTOMATION SERVICE

(71) Applicant: VCE Company LLC, Richardson, TX (US)

(72) Inventors: Hariharan Kannan, San Jose, CA (US); Akshaya Mahapatra, San Jose, CA (US); John J. Mulqueeney, Jr., San Bruno, CA (US); Thaddeus Stoner, Clearwater, FL (US); David Olszewski, Campbell, CA (US)

(73) Assignee: VCE Company, LLC, Richardson, TX (US)

( * ) Notice: Subject to any disclaimer, the term of this patent is extended or adjusted under 35 U.S.C. 154(b) by 430 days.

(21) Appl. No.: 13/743,224

(22) Filed: Jan. 16, 2013

(65) Prior Publication Data

US 2014/0201735 A1    Jul. 17, 2014

(51) Int. Cl.
*G06F 9/455*    (2006.01)
*G06F 9/50*    (2006.01)

(52) U.S. Cl.
CPC ........ *G06F 9/45533* (2013.01); *G06F 9/45558* (2013.01); *G06F 9/5077* (2013.01)

(58) Field of Classification Search
None
See application file for complete search history.

(56) References Cited

U.S. PATENT DOCUMENTS

| 5,659,786 | A | 8/1997 | George et al. |
|---|---|---|---|
| 6,609,127 | B1 * | 8/2003 | Lee et al. |
| 7,321,893 | B1 | 1/2008 | Rambacher et al. |
| 8,103,906 | B1 * | 1/2012 | Alibakhsh et al. ............... 714/13 |
| 8,839,222 | B1 * | 9/2014 | Brandwine et al. ........... 717/168 |
| 2006/0184937 | A1 * | 8/2006 | Abels et al. ........................ 718/1 |
| 2011/0083122 | A1 * | 4/2011 | Chen et al. .................... 717/124 |
| 2011/0088029 | A1 * | 4/2011 | Murase ............................. 718/1 |
| 2011/0239039 | A1 * | 9/2011 | Dieffenbach et al. .......... 714/4.1 |
| 2012/0297181 | A1 * | 11/2012 | Lee .................................. 713/2 |

OTHER PUBLICATIONS

Bryan D. Payne et al. "Secure and Flexible Monitoring of Virtual Machines", Computer Security Applications Conference, 2007, ACSA 2007, Twenty-third Annual, IEEE, Dec. 1, 2007, pp. 385-397.
International Search Report for PCT application No. PCT/US2014/011332 dated Mar. 31, 2014.

* cited by examiner

*Primary Examiner* — Adam Lee
(74) *Attorney, Agent, or Firm* — Polsinelli PC (57) ABSTRACT

A method and system is provided for managing virtual machine instances (VMs) and other computing and network infrastructure within a data center. A user designates a computing device or resource (whether physical or virtual) as a master automation object (e.g., a virtual machine instance may be designated as a virtual template for command replication). The user then establishes an association between the master object and a set of physical and/or virtual computing resources that should replicate a set of designated commands sent to the master object. An automation service then intercepts/observes commands sent to the master object and sends the intercepted/observed commands to each computing device linked to the master object.

25 Claims, 5 Drawing Sheets

MASTER AUTOMATION SERVICE

BACKGROUND OF THE INVENTION

1. Field of the Invention

Embodiments of the present invention generally relate to managing computing resources. More specifically, embodiments of the invention provide a virtual template service used to dynamically control the configuration and/or state of multiple data center systems simultaneously.

2. Description of the Related Art

Generally, in a virtualized computing environment, such as a data center hosting thousands of computing servers, virtual machine instances (VMs) are configured to run on one or more host computers. Each virtual machine uses CPU and memory resources of a host computer and runs its own operating system and application programs. Doing so allows each virtual machine to appear to operate as a separate, stand-alone computing system. An administrator of the virtualized environment can designate the amount of CPU and memory resources provisioned for each of the virtual machines on a host computer. In some virtualized environments, administrative tools are used to start, stop, and configure each virtual machine instance individually. Further, administrative tools may monitor resource usage on different host computers and provide load-balancing services at a level of virtual machine instances. Such software migrates virtual machines from one host computer to another, e.g., from a busy host computer to one that has excess capacity.

While managing the virtual and physical computing systems, along with the associated networking and storage systems hardware in a data center, it is often necessary to do a mass configuration update or to individually send the same command to multiple devices (whether physical or virtual devices). For example, enterprise solutions/applications today often include multiple virtual machines configured with common characteristics, e.g., a group of virtual machines may share a common operating system (OS), networking configuration, e.g., subnet, domain, and DNS assignments, and applications.

To provide a web-service, for example, one group of VMs having one configuration could provide web servers, while a second group could provide application servers, and a third could provide database systems. Further, each group could be configured to be part of a distinct subnet within the data center network. If the subnet needs to be changed for one of these groups, however, each machine in that group must be reconfigured individually or a one-off script composed to make the change to the affected group. Similarly, assume the web-server application is upgraded and requires changes to the configuration of the virtualized CPUs in the second group of VMs (e.g., to provide more dedicated processing capabilities). In such a case, each virtual machine in the web-server group would have to be reconfigured individually or a scripts written to perform this specific operation. A variety of other configuration requirements or administrative operations frequently need to be performed across multiple virtual machines, hypervisors managing the virtual machines on a given host, or the configuration of the hosts themselves. A similar issue arises for other data center computing resources. For example, a group of networking switches (physical or virtual) or other networking infrastructure within a data center may need to be updated with the same configuration changes.

In each of these cases, a variety of administrative applications may be used to individually configure (and reconfigure) each virtual machine, or other data center computing resource. However, doing so can require requires substantial time to complete a simple change.

SUMMARY OF THE INVENTION

Embodiments presented herein include a method for managing computing resources. This method may generally include monitoring a designated computing resource for an occurrence a specified command to be performed by the designated computing resource. Upon determining the command has been sent to the designated computing resource, one or more computing resources linked to the designated computing resource may be identified. Additionally, the specified command is performed on each of the one or more computing resources linked to the designated computing resource.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals are occasionally used to designate common figure elements. It is contemplated that elements disclosed in one embodiment may be beneficially used in other embodiments without specific recitation.

DETAILED DESCRIPTION

Embodiments of the invention provide a mechanism to manage virtual machine instances (VMs) and other computing and network infrastructure within a data center. In one embodiment, a user designates a computing device or resource (whether physical or virtual) as a master automation object. The administrator then establishes an association between the master object and a set of physical and/or virtual computing resources that should replicate a set of designated commands sent to the master object. An automation service then intercepts/observes commands sent to the master object and sends the intercepted/observed commands to each computing device linked to the master object. The command itself may be initiated by a user in a variety of ways, including, e.g., command line interaction (CLI), function calls, GUI input (mouse movement/clicks), procedure calls, message handling, script input/execution/output, etc.

The operations may be tailored to the particular computing resource used as a master object. However, examples include initiating a snapshot operation for a group of virtual machines; updating a DNS setting of a broad group of computing resources (e.g. VM instances physical hosts, routers switches, etc.; sending a revert snapshot operation to a group of virtual machines; and creating or configuring a VLAN in multiple network switches.

In one embodiment, the master object and the set of linked objects are of the same general type and configuration, e.g., a virtual machine instance designated as a virtual template for a group of linked virtual machine instances sharing a common guest operating system and virtualization configuration. However, in some cases, operations may be performed against different computing resource types (e.g., setting DNS entries on a variety of computing resources). For example, a switch associated with a virtual template may support some of the same commands or configuration settings made to the virtual template (e.g., creating or configuration a VLAN on multiple network switches and virtual machine hosts). Thus, the set of commands replicated by the virtual template service may be tailored for compatibility with the linked computing resources.

For example, in one embodiment, a VM instance may be designated as a master object—also referred to as a virtual template—and a group of virtual machines may be linked to the virtual template. Once linked, any changes made to the virtual template are replicated to the group of linked VMs. The actual command or operation is performed on the virtual template machine using a variety of available configuration and management tools. In this embodiment, a virtual template service is responsible for observing and replicating configuration changes to the rest of the virtual machines (and other data center systems) linked to the virtual template.

Continuing with the example of a virtual template, an administrative tool allows a user to designate a selected VM to serve as the virtual template. In one embodiment, the virtual template is a VM instance with no allocated storage or memory, as changes to these resources are not replicated to any linked VM. In contrast however, the network and virtualization configuration on the VM instance designated as the virtual template should generally match a desired configuration on the linked set of virtual machines. The virtual template is then registered with a virtual template service. The administrator also registers a group of one or more VM instances (or other computing resources) with the virtual template service. The administrator also specifies a set of operations, which, when performed on the virtual template, should also be performed on the linked VMs.

Note, a given VM may be linked to multiple virtual templates. Similarly, one virtual template may be linked to another, allowing cascading changes to be performed against groups of linked VMs. In one embodiment, the virtual template service also includes a discovery component configured to identify candidate VMs to include in the linked set of virtual machines.

The virtual template service is generally configured to intercept (or observe) operations made to the virtual template and also to then propagate such changes to (or execute the same command on) the virtual machines linked to the virtual template. For example, assume a snapshot operation is performed on the virtual template. In such a case, the virtual template service intercepts the operation (which is performed against the template). The same snapshot operation is then performed against each VM linked to the virtual template. As another example, assume an operation is performed to add a virtual network interface card to the virtual template. In such a case, the virtual template service intercepts this operation and performs an add network interface card on each virtual machine linked to the template.

More generally, commands may be performed against (i) the virtual machine container, such as a snapshot or revert operation or (ii) the virtual machine itself, such as changing certain configuration settings, e.g., changes to a networking subnet, DNS or other service addresses, or changes to components exposed to the guest operating system. In the example of a virtual template and linked virtual machines, the operations may include creating a snapshot a VM, reverting to a prior snapshot, adding/removing network components, joining or exiting a domain, powering on/off or reboot, running other administrative commands on a VM, etc. When a command is performed to the virtual template, that same operation is also performed on each linked VM automatically. Of course, some operations are not replicated, e.g., a change to the IP address of the virtual template is not replicated to the linked virtual machines.

The process for other data center hardware or virtualized computing resources is similar. For example, a switch (physical or virtual) may be designated as a master object for command replication to linked objects. A group of data center switches that should share certain configuration or state settings may be linked to the one designated as being the master object. Thereafter, certain commands performed to the master switch are replicated to each linked switch.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present invention, a cloud based application may be configured to allow a user to designate a virtual machine instance (or other computing resource) as a master object as well as designate a group of other computing resources (e.g., a group of virtual machines hosted by a cloud based service) to which any commands sent to the master object should be replicated.

Also note, for convenience, some embodiments are described herein using a virtual machine designated as a virtual template as a reference example of a master object. However, one of ordinary skill in the art will recognize that embodiments of the invention may be adapted for use with a broad variety of physical and/or virtual computing resources within a data center including, e.g., physical servers, hosting other VMs, physical servers generally, network infrastructure, e.g., routers and switches, etc.

Figure 1:
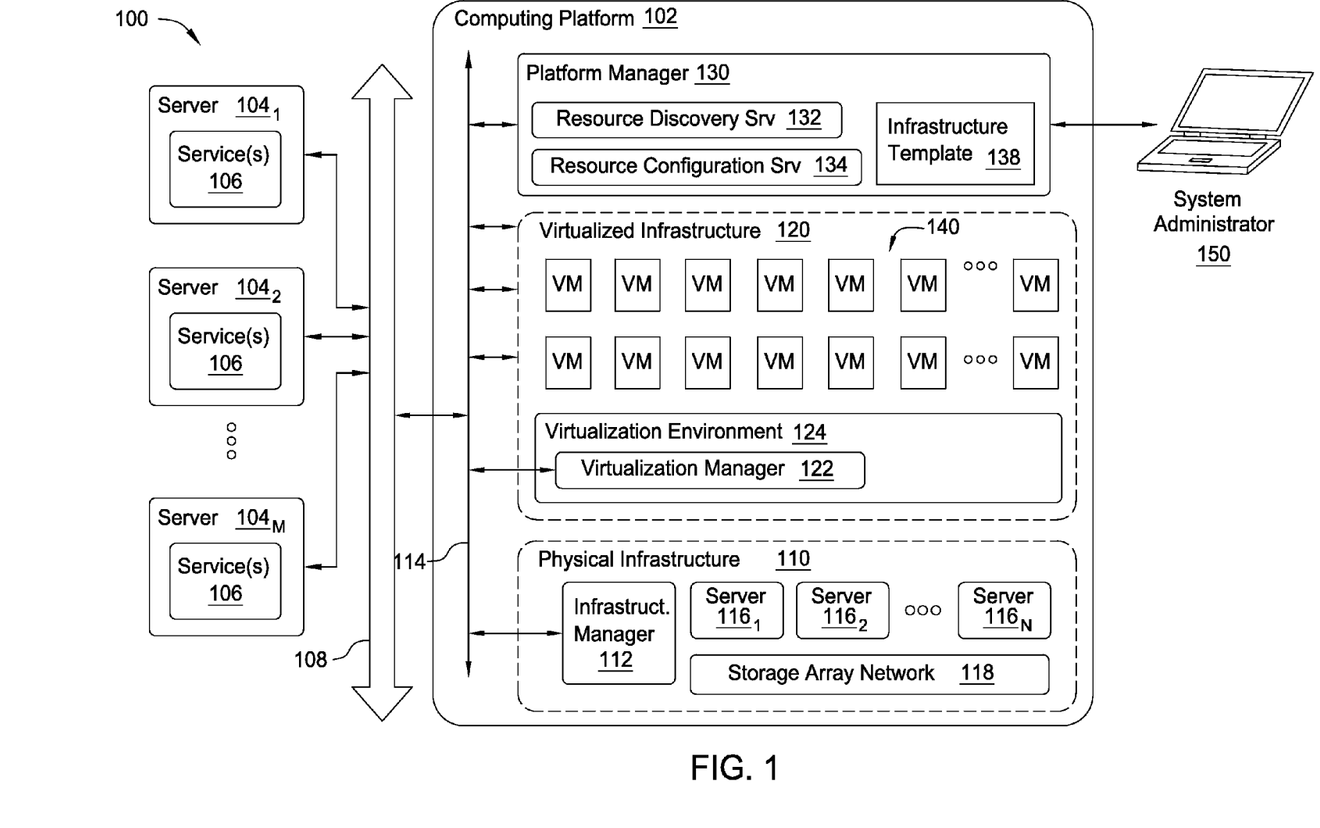
FIG. 1 illustrates an integrated computing platform configured for providing a virtualized environment, according to one embodiment.

FIG. 1 illustrates an integrated computing platform 102 configured to provide a virtualized environment, according to one embodiment of the present disclosure. An administrator 150 desires to deploy the integrated computing platform 102 within an existing computing environment (e.g., data center 100). The data center 100 may include a plurality of servers (illustrated as servers $104_1$, $104_2$, $104_M$) that run one or more services 106. The servers 104 may include conventional computing components (e.g., processor, memory, storage) or may be virtual machines (VMs) executing on such physical hardware. The services 106 running on the servers 104 provide applications to users including, e.g., directory services, web server, database server, accounting, application serving, file management, storage, backup services, etc. As described in detail below, the administrator may wish to deploy the integrated computing platform 102 such that physical and virtual resources (e.g., VMs) running inside of the integrated computing platform 102 may communicate with the services 106 of the existing data center 100.

As shown, the computing platform 102 includes a physical infrastructure 110 configured to support a virtualized infrastructure 120. In the embodiment shown in FIG. 1, physical infrastructure 110 includes hardware resources, such as servers $116_1$ to $116_N$ (sometimes referred to as "hosts") and one or more storage array networks (SAN), such as SAN 118, connected by a network 114. The virtualized infrastructure 120 may include a virtualization environment 124 which itself includes one or more virtual machines 140. The computing platform 102 may be connected to other computing systems, such as workstations, personal computers, data center servers, via a network 128, such as the Internet. In one embodiment, components of the computing platform 102 (e.g., servers, network, storage, software, etc.) may be organized into a single integrated framework sometimes referred to as "converged infrastructure." The components of the computing platform 102 provide a pool of virtualized server, storage, network resources shared by multiple applications and/or organizations within an enterprise.

In one embodiment, the physical infrastructure 110 may be organized into a "computing-block" based infrastructure, wherein physical infrastructure units are characterized by repeatable units of construction having similar performance, operational characteristics, and discrete requirements of power, space, and cooling that facilitate rapid deployment, integration, and scalability. For example, the "computing block" may dynamically provision hardware resources based on performance demands placed on the physical infrastructure 110. One example of physical infrastructure 110 is a Vblock™ System available from the VCE Company, LLC.

The physical infrastructure 110 also includes an infrastructure manager 112 configured to manage the configuration, provisioning, and policy compliance of the physical infrastructure 110. Infrastructure manager 112 provides an interface to manage the provisioning of hardware resources (e.g., computing, networking, storage). In one embodiment, the infrastructure manager 112 may be included in each unit of physical infrastructure 110 to manage the configuration, provisioning, and compliance of each distinct computing block. The infrastructure manager 112 may simplify deployment and integration into IT service catalogs and workflow engines, and dramatically simplifies computing-block platform deployment by abstracting the overall provisioning while offering granular access to individual components for troubleshooting and fault management.

In one embodiment, the infrastructure manager 112 may include a configuration including a list of IP address and system credentials to assign newly provisioned systems. The platform manager 130 and/or the virtualized infrastructure 120 may connect to and communicate with the infrastructure manager 112 of the physical infrastructure 110 to manage and/or configure the physical infrastructure 110. One example of an infrastructure manager includes EMC Ionix Unified Infrastructure Manager (UIM) available from EMC Corporation. Similarly, the network 114 may include a network manager configured to configure network devices (e.g., switches, routers) and manage addressing, subnets, virtual local area networks (VLANs), and other network configurations. One example of a network manager includes a Cisco Switch accessible via a Cisco IOS CLI available from Cisco System, Inc.

The virtualized infrastructure 120 includes a virtualization environment 124 configured to simulate (i.e., to virtualize) conventional components of a computing device, e.g., a processor, system memory, a hard disk drive, for executing one or more virtual machines 140. For example, each virtual machine 140 may include a virtual processor and a virtual system memory configured to execute an application. In one example implementation of an embodiment similar to that of FIG. 1, virtualization environment 124 may be implemented by running VMware vSphere®- or VMware ESX®-based hypervisor technologies on servers $116_1$ to $116_n$ provided by VMware, Inc. of Palo Alto, Calif. (although it should be recognized that any other virtualization technologies, including Xen® and Microsoft Hyper-V virtualization technologies may be utilized consistent with the teachings herein). As described above, a hypervisor application may provide a foundation for building and managing a virtualized IT infrastructure, such as the virtualized infrastructure 120. The hypervisor may abstract processor, memory, storage and networking resources into multiple virtual machines that run unmodified operating systems and applications.

In one embodiment, a virtualization manager 122 provides software application used to manage the virtualized infrastructure 120. The virtualization manager 122 may provide end-to-end datacenter management through a set of APIs that enable integration with third-party management tools. The virtualization manager 122 may be configured to manage provision of VMs 140 within the virtualized infrastructure 120 and to configure VMs 140 with computing, network, and storage configurations suitable for interoperability with other VMs 140 within the virtualized infrastructure 120. One example of the virtualization manager 122 may be the VMware vCenter virtualized management platform from available from VMware, Inc.

As shown, the computing platform 102 also includes a platform manager 130 connected to the virtualized infrastructure 120 and physical infrastructure 110 by the communications network. The platform manager 130 is configured to provision and configure resources from physical infrastructure 110 and virtualized infrastructure 120 for use in deploying an application within the computing platform 102. For example, if virtualized infrastructure 120 requires additional VMs to scale a currently running application during peak traffic, platform manager 130 can coordinate with the virtualization manager 122 to instantiate additional virtual machines to support such needs and configure the instantiated virtual machines with network settings matching those existing virtual machines.

Further, in context of the present invention, the platform manager 130 may include an automation service component, described in detail below. Such a component may provide one or more software applications used to designate a master object, e.g., a virtual machine instance to designate as a virtual template, designate computing resources (e.g., VMs) to link (or unlink) to the master object, and to specify what commands or operations, when carried out on the master object, should be replicated to the group of linked computing resources. A detailed example of an automation service component is described below relative to FIGS. 2 and 3.

As shown, the platform manager 130 includes a resource discovery service 132 configured to identify resources (e.g., servers 104, services 106) that are of interest to the system administrator 150 seeking to connect the newly-deployed computing platform 102 with the rest of the data center 100. In some embodiments, the resource discovery service 132 may identify network switches and blades of network 108 that have to be configured to allow communication between the computing platform 102 and the rest of existing data center 100. In context of the present disclosure, the resource discovery service may identify VMs and other computing resources in data center 100, that are compatible with a given master automation object. For example, the resource discovery service 132 may be configured to identify VMs that may be linked to a given virtual template. Such VMs may be identified using any suitable criteria.

In one embodiment, the platform manager 130 is configured to generate an infrastructure template 138 based on the resources identified by the resource discovery service 132. The infrastructure template 138 includes infrastructure parameters that describe the existing computing environment (e.g., data center 100) in which the integrated computing platform 102 is being deployed. Examples of infrastructure parameters specified by the infrastructure template 138 include: VLAN identifiers that the network 114 of the computing platform 102 should use for communicating with the network 108 of the existing data center 100, IP addresses of a DNS service running within the data center 100, and a range of IP addresses, subnet masks, and gateway IP address to be assigned to VMs 140 of the computing platform 102. In some embodiments, the infrastructure template 138 may be generated specific to an application deployed within the computing platform 102. As such, the infrastructure parameters contained in the infrastructure template 138 may address specific configurations, settings, and information needed by the application executing within the computing platform 102.

In some embodiments, the platform manager 130 may be configured to import and export infrastructure templates 138 so that the infrastructure templates 138 may be easily transferred between other instances of converged infrastructure (e.g., computing platform 102). The platform manager 130 may also import and export of infrastructure templates 138 to backup known configurations and settings of the computing platform 102, test and deploy a known infrastructure template 138, and perform other such administrative tasks.

In one embodiment, the platform manager 130 includes a resource configuration service 134 for configuring physical resources and virtual resources of the computing platform 102 based on an infrastructure template 138. For example, the resource configuration service 134 may configure the network switches and blades based on the infrastructure template 138 to allow communication between the converged infrastructure (e.g., computing platform 102) and the existing data center 100. In another example, the resource configuration service 134 may configure network interface cards (NICs) of VMs 140 running within the computing platform 102 based on infrastructure parameters of the infrastructure template 138. Further, when used to configure certain parameters of an network interface (e.g., a DNS address setting) of a virtual machine designated as a virtual template, the automation component may replicate such a configuration change to a group of linked virtual machines.

Figure 2:
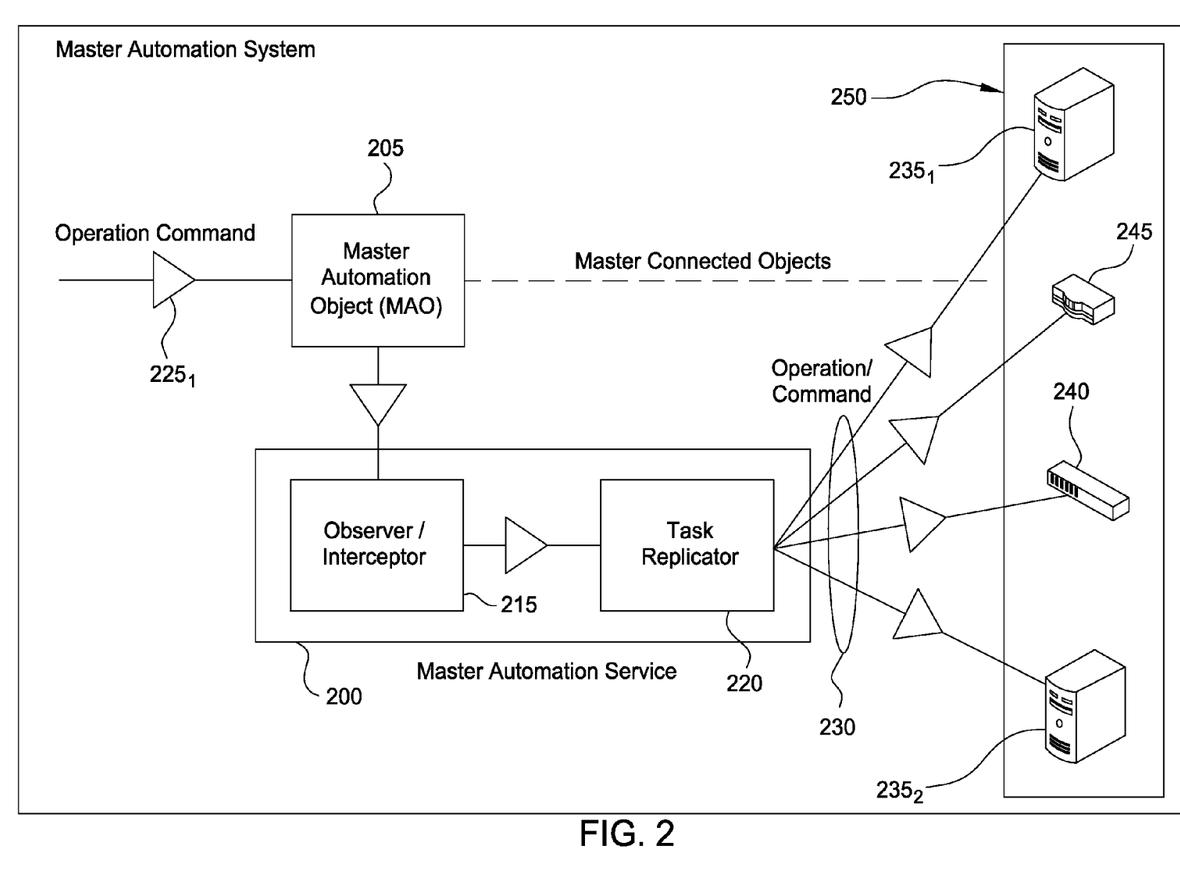
FIG. 2 illustrates a master automation system configured to replicate changes made to a master object to a set of linked computing resources, according to one embodiment.

For example, FIG. 2 illustrates a master automation service 200 configured to replicate changes operations sent to a master object 205 on a set of linked computing resources 250, according to one embodiment. The master automation service 200 provides a software application used to manage what computing resources are designated as a master object 205, as well as manage what operations 225 are replicated to what data center computing resources 250. As shown, the master automation service 200 includes an observer/interceptor component 215 and a task replicator 220. The observer/interceptor component 215 provides a software component configured to monitor the master object 205 for the occurrence of an operation/command 2251. For example, the observer/interceptor component 215 may be configured to monitor network traffic sent to the master automation object 205 to identify control messages or commands. Alternatively (or additionally) observer/interceptor component 215 may monitor the master automation component 205 for changes to certain configuration settings (e.g., a change in the DNS server settings). As another alternative, a plug-in, daemon, or other software agent on master automation object 205 may be configured to signal the observer/interceptor component 215 when a change occurs to a monitored setting.

Other examples of operations 225 which may be observed/interceptor by component 215 include sending a snapshot operation to a group of virtual machines in data center computing resources 250; reverting a group of virtual machines to a prior snapshot; updating network configuration settings, such as updating a DNS setting for data center computing resources 250; and creating/configuring a shared attribute for a VLAN in multiple network switches. More generally, any command (whether referred to as a command, operation, configuration setting, etc.) that can be sent to or performed by the master object 205 is a candidate for being replicated to a corresponding group of computing resources in the data center computing resources 250. Accordingly, the particular set of commands may be tailored to suit the needs of a particular case.

In one embodiment, after the observer/interceptor component 215 determines that an operation/command has been performed or has been sent to the master object 205, it sends that same command to the task replicator component 220. In turn, the task replicator component 220 sends or performs the same command or operation to one or more of the data center computing resources 250 linked to the master object 205.

For example, assume that the master automation object 205 is a virtualized network switch running inside a VM instance and a user performs an operation to update a DNS server address used by this virtualized switch. When observed by the observer/interceptor component 215, the update is recognized as one that should be replicated to data center computing resources 250 linked to the virtualized switch (i.e., master object 205). In turn, the task replicator 220 performs an operation to replicate the DNS address update to network switches 240 and 245 and to computing hosts $235_{1\text{-}2}$—shown as replicated tasks 230. Note, in this example the updates to computing hosts $235_{1\text{-}2}$ may include updating a physical configuration used by a computing host as well as updates to a configuration for a virtualized switch or virtual machines instances hosted by the computing hosts $235_{1\text{-}2}$.

Additionally, the observer/interceptor 215 and task replicator 220 may maintain a log of what operations are performed as well as any errors that occur, e.g., an indication that the task replicator 220 was unable to update a DNS server address on one of the data center computing resources 250. Further, in one embodiment, one of the data center computing resources 150 is itself a master object monitored by the automation service 200. In such a case, operations may be cascaded to groups of computing resources linked to distinct master automation objects.

Figure 3:
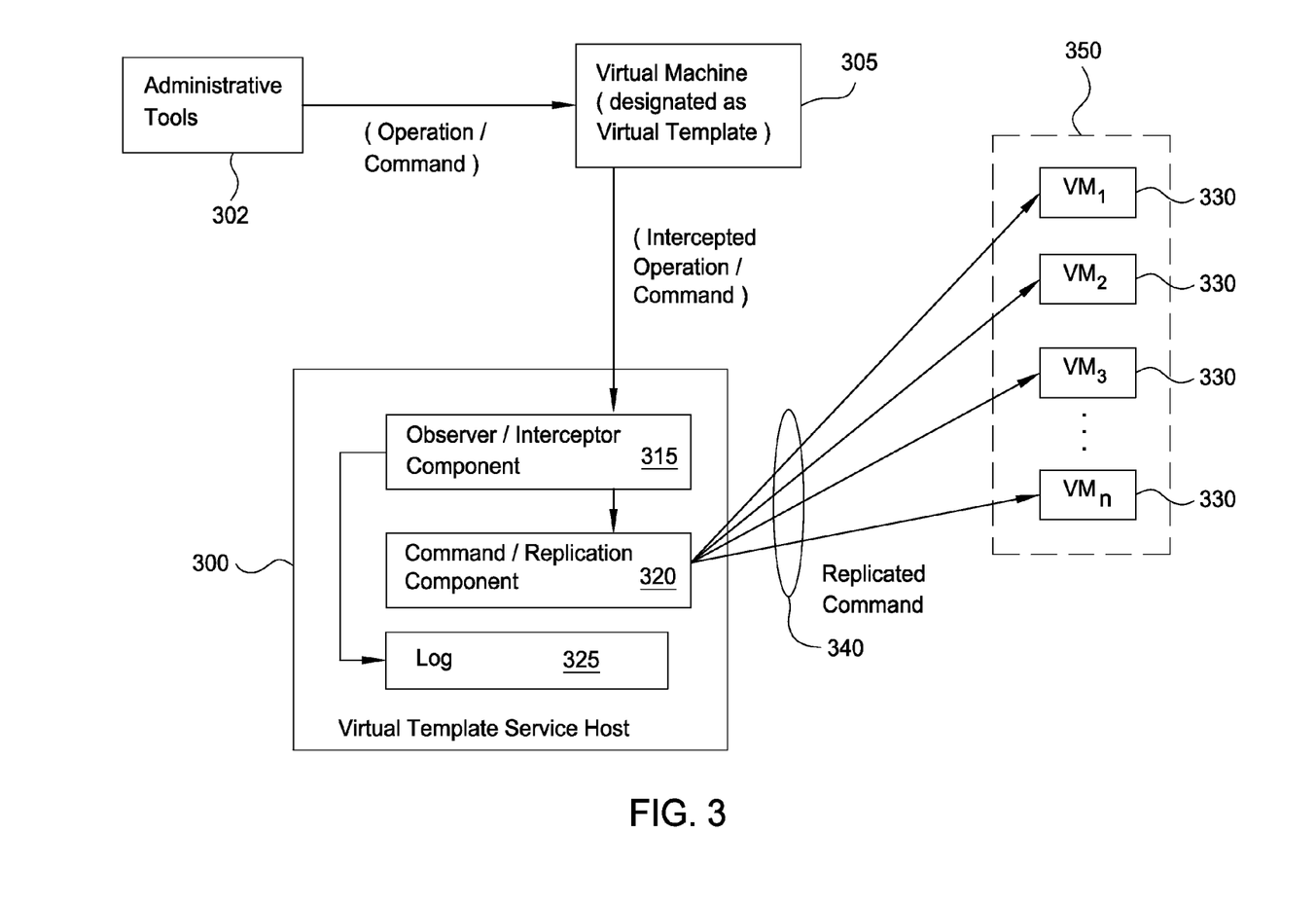
FIG. 3 illustrates a reference example of a virtual machine instance used as a virtual template for a set of linked virtual machine instances, according to one embodiment.

FIG. 3 illustrates a reference example of a virtual machine instance used as a virtual template for a set of linked virtual machine instances, according to one embodiment. More specifically, FIG. 3 illustrates an example of the master automation service 200 of FIG. 2 using a virtual machine designated as a master automation object, where certain changes to the configuration or state of the virtual machine are replicated to a set of linked virtual machines 350.

As shown, a virtual template service host 300 provides a software application running on a physical (or virtual) computing system. The virtual template service host 300 is generally configured to allow users to designate a virtual machine as a virtual template 305, link (and unlink) a set of VMs 350 to the virtual template 305, and components used to monitor/observe for commands or operations applied to the virtual template 315. For example, as shown, the virtual template service host 300 includes an observer/interceptor component 315, a command replication component 320, and a log 325.

The observer/interceptor component 315 provides software configured to monitor a virtual machine designated as the virtual template 305 for a selected set of operations or commands that should be replicated to virtual machines 350. Illustratively, administrative tools 302 may be used to perform a variety of operations to the virtual template 305. For example, the administrative tools 302 may be used to create (or revert to) a snapshot of virtual template 305, add/remove network interface components, join (or un-join) a domain, power on/off or reboot a virtual machine, run a command against a VM container, or configure elements of the guest operating system, or delete a running VM. More generally, the commands intercepted by component 315 may be initiated by a user in a variety of ways, including, e.g., CLI interaction, function calls, GUI input (mouse movement/clicks), procedure calls, message handling, script input/execution/output, etc. Of course the particular type or set of commands or operations replicated to the set of linked virtual machines 350 may be tailored to suit the need of an individual case.

Further, the service host 300 may also be configured to discover new VMs that could be linked to virtual template 305. For example, in one embodiment, the virtual template 305 may be linked to one (or more) virtual machine (VM) templates. Note, in the present context, a VM template refers to a template for a virtual machine instance that may be spawned on a physical host. Thus, a user may create a virtual machine instance from a given VM template and designate the resulting virtual machine instance as virtual template 305 for command replication. Once done, the observer/interceptor component 315 may identify when a new virtual machine instance is spawned from the same VM template and recommend that the new VM instance be linked to the virtual template 305 (or automatically link new instances to the virtual template 305). In one embodiment, such a virtual machine instance may have any subsequent commands monitored by observer/interceptor component 315 replicated to that virtual machine instance. Alternatively however, when a new virtual machine instance is spawned and added to the set of virtual machines 350, the observer/interceptor component 315 may replicate any previously applied commands/operation applied to the virtual template 305 (e.g., by parsing log 325).

Once the observer/interceptor component 315 observes a command/operation sent from administrative tools 302 to virtual machine template 305, it sends the command/operation to command replication component 320. In turn, the command replication component identifies the linked virtual machines 330 and sends the command (or performs the operation) on each such virtual machine 330—shown in FIG. 3 as replicated commands 340. Additionally, the command replication component 320 may record the success (or failure) of each command/operation replicated to one of the virtual machines 330.

Figure 4:
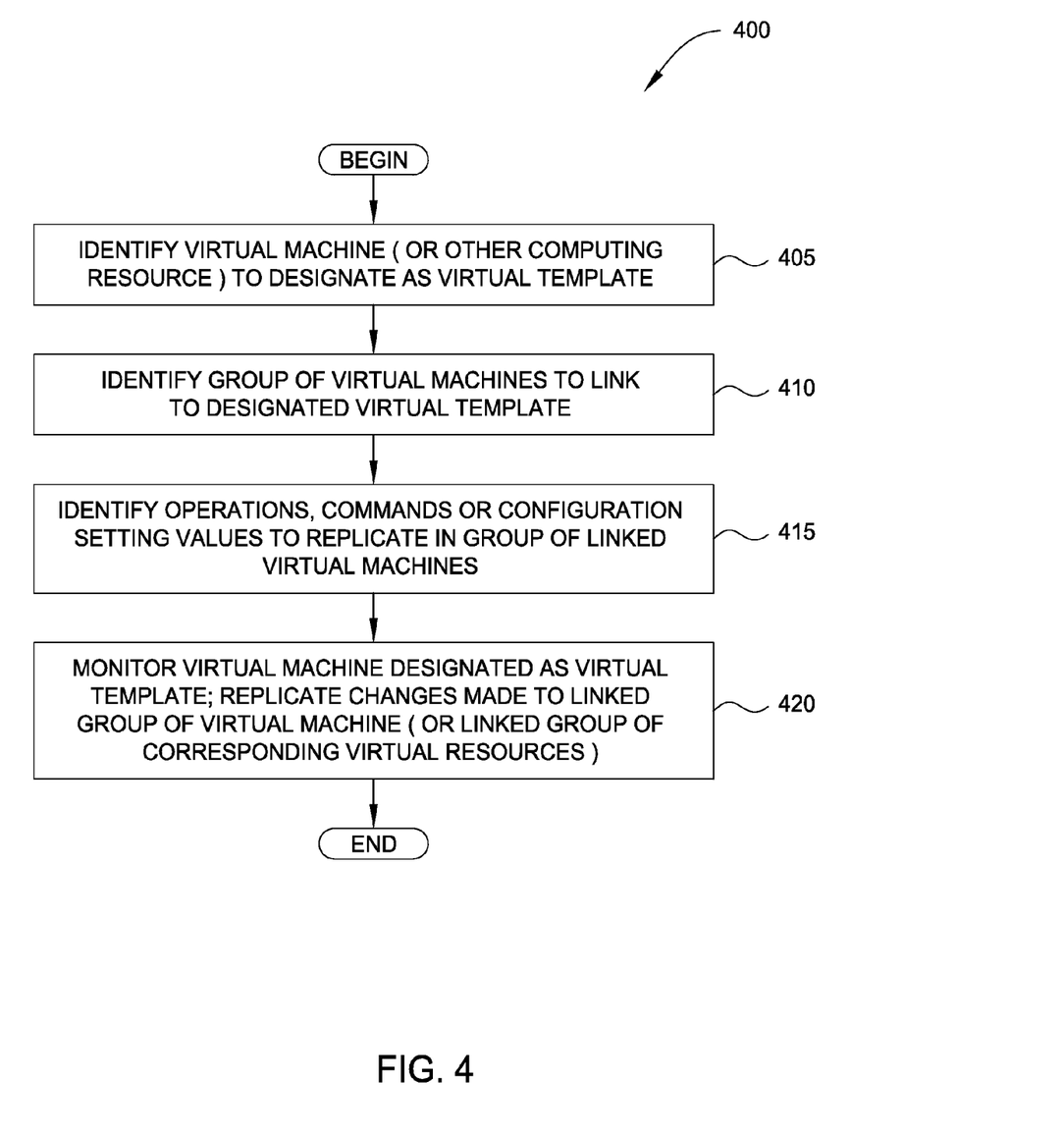
FIG. 4 illustrates a method for configuring a master object to use for replicating configuration and/or state changes to a set of linked computing resources, according to one embodiment of the present disclosure.

FIG. 4 illustrates a method 400 for configuring a master object to use for replicating configuration and/or state changes to a set of linked computing resources, according to one embodiment of the present disclosure. As shown, the method 400 begins at step 405, where the automation service identifies a computing resource to designate as a virtual template for command replication. For example, a user may interact with the software provided by the automation service to select a virtual machine instance (or spawn a new virtual machine instance) to act as the virtual template for command replication. As noted, in addition to a virtual machine instance other data center infrastructure, such as a switch or router (virtual or physical) may be designated as a master object for command replication.

At step 410, the user specifies a group of virtual machines (and/or other computing resources) to link to the master object. Alternatively (or additionally), the discovery service may identify a set of candidate virtual machines instances to link to the virtual template. At step 415, the user may specify a set of operations, commands, configuration setting values, or other actions that may be carried out on the master object designated at step 405 that should be replicated to the set of computing resources identified at step 410, when performed against the master object. At step 420, the automation service may monitor the master object for any of the commands, operations, etc., identified at step 415. For example, as described, an interceptor/observer component may monitor a virtual template for commands sent from an administrative or configuration tool. Further, once observed, the command is past to a command replication component which, in turn, replicates the command to one or more of the linked computing resources (e.g., replicates the command to a set of linked virtual machines).

Figure 5:
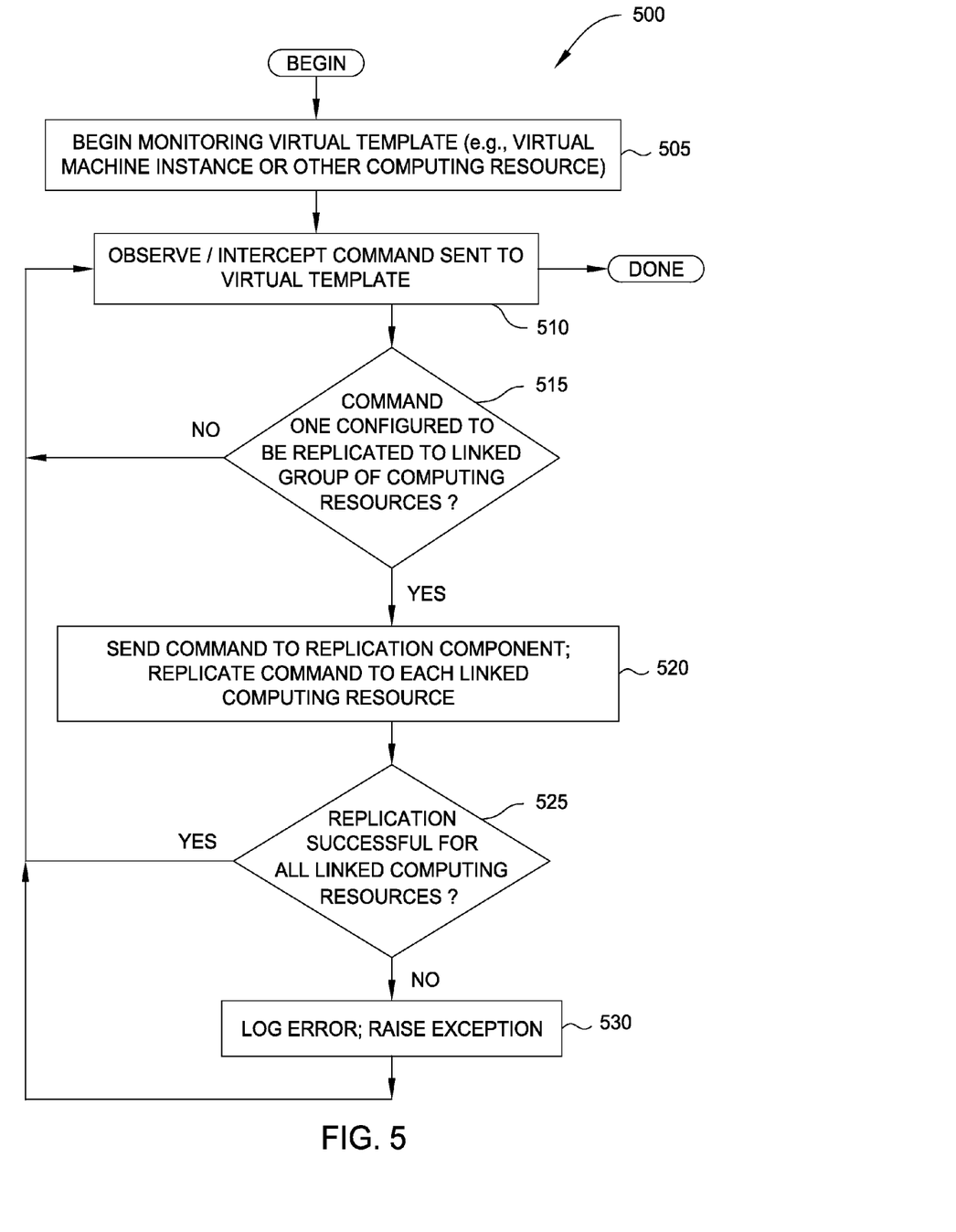
FIG. 5 illustrates a method for replicating changes made to a master object to a group of linked computing resources, according to one embodiment.

FIG. 5 illustrates a method 500 for replicating changes made to a master object to a group of linked computing resources, according to one embodiment. The method 500 illustrates an example embodiment of step 420 of the method 400 shown in FIG. 4.

As shown, the method 500 begins at step 505, wherein the observer/interceptor component monitors for a command sent to virtual machine instance designated as a virtual template (or sent to other designated master object). After monitoring a command (or other operation) sent to the virtual template, at step 515, the observer/interceptor component determines whether the command is one that should be replicated to one or more linked objects, e.g., a set of virtual machines linked to the virtual template. If so, the interceptor/observer component sends the command to the command replication component. In turn, at step 520, the interceptor/observer component replicates the command to each linked virtual machine (or other computing resource). At step 525 the automation service determines whether the command was successfully replicated to each virtual machine. If not, at step 525, an exception or error is raised or written to the log. If so, then the authorization service may record an entry in the log reflecting that replication to each linked virtual machine (or other computing resource) was performed successfully. Thereafter, the method 500 returns to step 510, where the automation service continues to monitor the virtual template for additional commands to be replicated.

Advantageously, as described above, embodiments of the invention provide a mechanism to manage virtual machine instances (VMs) and other data center systems. In one embodiment, a user designates a computing device or resource (whether physical or virtual) as a master automation object. The administrator then establishes an association between the master object and a set of physical and/or virtual computing resources that should replicate a set of designated commands or configuration operations sent to the master object. An automation service then intercepts/observes commands sent to (or operations performed on) the master object and sends the intercepted/observed commands to each computing device linked to the master object.

Various embodiments of the present disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

While the foregoing is directed to embodiments of the present disclosure, other and further embodiments of the present disclosure may be devised without departing from the basic scope thereof, and the scope thereof is determined by the claims that follow.

The invention claimed is:

1. A method comprising:
receiving a selection of a designated computing resource from among a plurality of computing resources of an integrated computing platform;
receiving an identification of one or more other computing resources from among the plurality of computing resources that are compatible with the selected designated computing resource;
linking the identified one or more other computing resources with the selected designated computing resource;
monitoring the selected designated computing resource for an occurrence of a specified command to be performed by the selected designated computing resource;
upon determining the specified command has been sent to the selected designated computing resource:
performing the specified command on each of the identified one or more other computing resources linked to the selected designated computing resource; and
unlinking the identified one or more other computer resources from the selected designated resource.

2. The method of claim 1, wherein the selected designated computing resource comprises an instance of a virtual machine designated as a virtual template for command replication.

3. The method of claim 2, wherein the instance of the virtual machine designated as the virtual template is spawned from a virtual machine template, and wherein further additional instances spawned from the virtual machine template are added to comprise the identified one or more other computing resources linked to the virtual template.

4. The method of claim 2, wherein at least one of the identified one or more other computing resources linked to the selected designated computing resource comprises a second virtual machine designated as a second virtual template for command replication.

5. The method of claim 2, wherein the specified command comprises a command for configuring the virtual machine instance designated as the virtual template.

6. The method of claim 2, wherein the specified command comprises a command for configuring a guest operating system hosted by the virtual machine instance designated as the virtual template.

7. The method of claim 1, wherein the selected designated computing resource comprises at least one of a network switching device and a network routing device.

8. The method of claim 1, wherein one or more of the linked computing resources comprise one or more virtual machine instances executing on a host server.

9. The method of claim 1, further comprising, recording an indication of whether the specified command is successfully performed on each of the identified one or more other computing resources linked to the selected designated computing resource.

10. The method of claim 1, wherein the specified command is initiated as at least one of a command line interaction (CLI), one or more function calls, graphical user interface (GUI) input, a procedure call, a message handling event, and a script input/execution/output.

11. A tangible non-transitory computer-readable storage medium comprising instructions that, when executed in a computing device perform the steps of:
receiving a selection of a designated computing resource from among a plurality of computing resources of an integrated computing platform;
receiving an identification of one or more other computing resources from among the plurality of computing resources that are compatible with the selected designated computing resource;
linking the identified one or more other computing resources with the selected designated computing resource;
monitoring the selected designated computing resource for an occurrence of a specified command to be performed by the selected designated computing resource;
upon determining the specified command has been sent to the selected designated computing resource:
performing the specified command on each of the identified one or more other computing resources linked to the selected designated computing resource; and
unlinking the identified one or more other computer resources from the selected designated resource.

12. The tangible non-transitory computer-readable storage medium of claim 11, wherein the selected designated computing resource comprises an instance of a virtual machine designated as a virtual template for command replication.

13. The tangible non-transitory computer-readable storage medium of claim 12, wherein the instance of the virtual machine designated as the virtual template is spawned from a virtual machine template, and wherein further additional instances spawned from the virtual machine template are added to comprise the identified one or more other computing resources linked to the virtual template.

14. The tangible non-transitory computer-readable storage medium of claim 12, wherein at least one of the identified one or more other computing resources linked to the selected designated computing resource comprises a second virtual machine designated as a second virtual template for command replication.

15. The tangible non-transitory computer-readable storage medium of claim 12, wherein the specified command comprises a command for configuring the virtual machine instance designated as the virtual template.

16. The tangible non-transitory computer-readable storage medium of claim 12, wherein the specified command comprises a command for configuring a guest operating system hosted by the virtual machine instance designated as the virtual template.

17. The tangible non-transitory computer-readable storage medium of claim 11, wherein the selected designated computing resource comprises one of a network switching device and a network routing device.

18. The tangible non-transitory computer-readable storage medium of claim 11, wherein one or more of the linked computing resources comprise a virtual machine instances executing on a host server.

19. The tangible non-transitory computer-readable storage medium of claim 11, wherein the steps further comprise, recording an indication of whether the specified command is successfully performed on each of the identified one or more other computing resources linked to the selected designated computing resource.

20. A computing system comprising:
a server hosting an automation service, wherein the automation service includes:
an interceptor/observer component configured to:
receive a selection of a designated computing resource from among a plurality of computing resources of an integrated computing platform;
receive an identification of one or more other computing resources from among the plurality of computing resources that are compatible with the selected designated resource;
link the identified one or more other computing resources with the selected designated computing resource;
monitor the selected designated computing resource for an occurrence of a specified command to be performed by the selected designated computing resource, and
upon determining the specified command has been sent to the selected designated computing resource, sending an indication of the command to a replication component; and
the replication component, wherein the replication component is configured to perform the specified command on each of the identified one or more other computing resources linked to the selected designated computing resource, wherein the interceptor/observer component is further configured to unlink the identified one or more other computer resources from the selected designated resource.

21. The system of claim 20, wherein the selected designated computing resource comprises an instance of a virtual machine designated as a virtual template for command replication.

22. The system of claim 21, wherein the instance of a virtual machine designated as the virtual template is spawned from a virtual machine template, and wherein further additional instances spawned from the virtual machine template are added to comprise the identified one or more other computing resources linked to the virtual template.

23. The system of claim 20, wherein the selected designated computing resource comprises one of a network switching device and a network routing device.

24. The system of claim 20, wherein one or more of the linked computing resources comprise a virtual machine instances executing on a host server.

25. The system of claim 20, wherein the replication component is further configured to record an indication of whether the specified command is successfully performed on each of the identified one or more other computing resources linked to the selected designated computing resource.

* * * * *